C. G. HOWARD.
MACHINE FOR DRESSING FLAX AND HEMP.
No. 44,138. Patented Sept. 6, 1864.
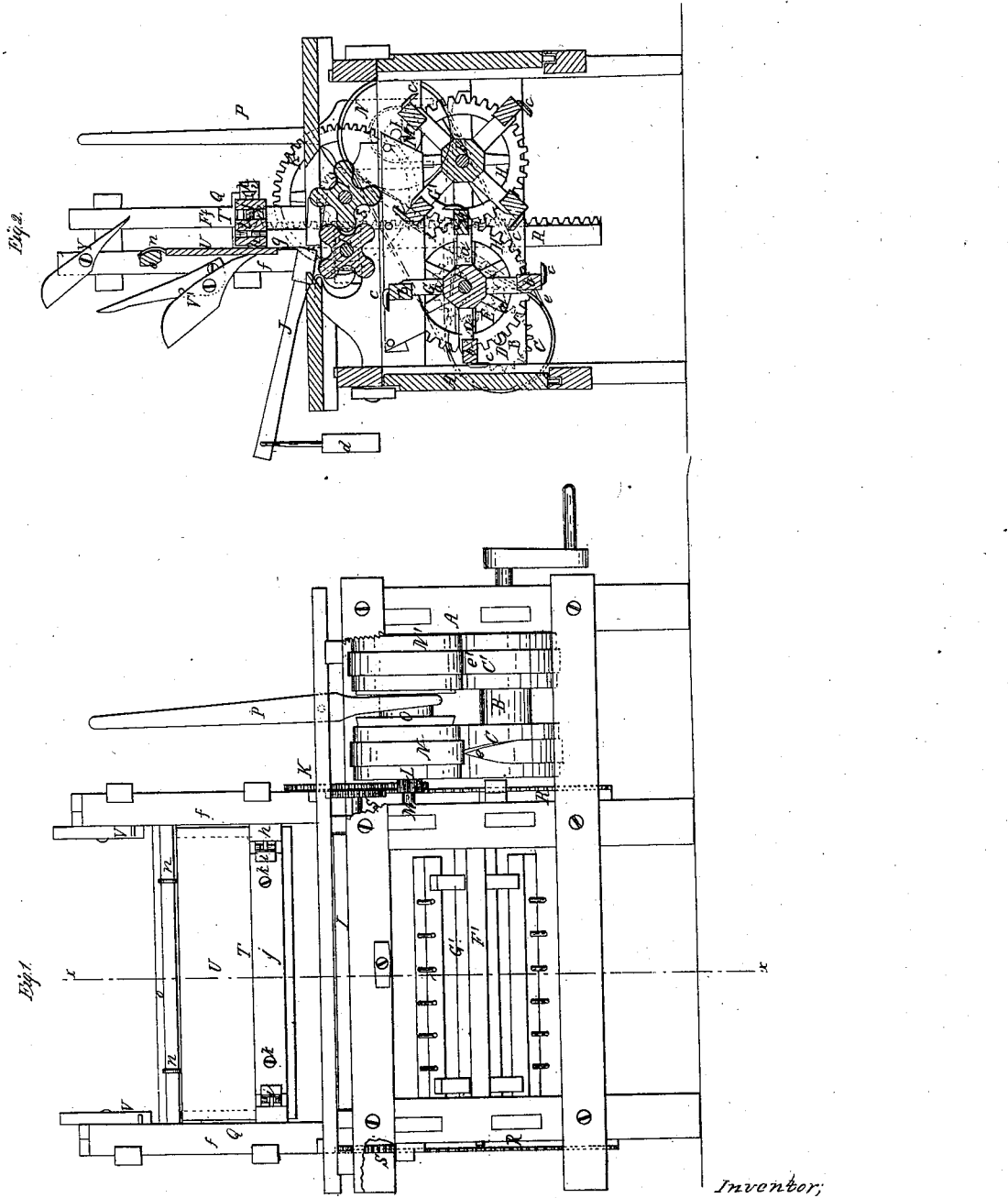

UNITED STATES PATENT OFFICE.

C. G. HOWARD, OF TOPEKA, KANSAS, ASSIGNOR TO HIMSELF AND
E. A. GOODELL, OF SAME PLACE.

IMPROVEMENT IN MACHINES FOR DRESSING FLAX AND HEMP.

Specification forming part of Letters Patent No. 44,138, dated September 6, 1864.

*To all whom it may concern:*

Be it known that I, C. G. HOWARD, of Topeka, in the county of Shawnee and State of Kansas, have invented a new and Improved Hemp and Flax Dressing Machine; and I do hereby declare that the following is a full, clear, and exact description of the same, reference being had to the accompanying drawings, making a part of this specification, in which—

Figure 1 is a side view of my invention; Fig. 2, a transverse vertical section of the same, taken in the line $x$ $x$, Fig. 1.

Similar letters of reference indicate like parts.

This invention consists in the employment or use of two fluted breaking-rollers, two rotary dressers, and a rising or falling clamp to hold the hemp or flax while being operated upon, all being arranged to operate in the manner substantially as hereinafter set forth.

To enable those skilled in the art to fully understand and construct my invention, I will proceed to describe it.

A represents a framing, which may be constructed in any proper manner to support the working parts of the device.

B is a driving-shaft placed horizontally in one part of the framing A, and having two pulleys, C C', placed upon it, and firmly secured by keys; and a toothed wheel, D, is also keyed on the inner end of said shaft, the wheel D gearing into a corresponding wheel, E, on the shaft F of a rotary dresser, G, the latter being composed of arms $a$, projecting radially from the shaft F, and having bars $b$ at their ends to which teeth $c$ are attached at right angles, as shown clearly in Fig. 2. There are two of these rotary dressers, G G', and they are constructed precisely similar, and connected by gear-wheels H H at one end of their shafts F F'. Motion is communicated to the dressers G G' from the driving shaft B by means of the toothed wheels D E previously alluded to.

I I' represent two fluted breaking-rollers which gear into each other, and are directly above the rotary dressers G G'. The roller I' works in fixed bearings, but the roller I has its journals fitted in sliding boxes, which are acted upon by levers J, having weights $d$ on their ends. These levers and weights have a tendency to keep the two rollers working in close contact, and still admit of the roller I yielding or giving to a certain extent, as may be required. Motion is communicated to the rollers I I' by means of a toothed wheel, K, on the roller I', which gears into a pinion, L, on a shaft, M. The shaft M has two loose pulleys, N N', placed upon it, either of which may be connected with the shaft M by means of a clutch, O, placed between them, said clutch being operated by a lever, P. The pulley N has a cross-belt, $e$, passing around it from the pulley C, while the pulley N' has a straight belt, $e'$, passing around it from the pulley C'.

Q is an upright frame formed of two pairs of uprights, $f$ $f$, with a space between each pair for a vertical rack-bar, R, to work in. Into these rack-bars pinions S S on the shaft of the fluted roller I' gear; and each rack-bar has a spring or elastic projection, $g$, attached to it, on which a clamp, T, rests. This clamp is composed of a bar, $h$, having a spring-catch, $i$, at each end of it; and a bar, $j$, is fitted loosely on screws $k$ $k$, which pass into a bar, $l$, a spring, $m$, being interposed between the two bars $j$ $l$. The catches $i$ $i$ hold the bar $j$ while the bar $l$ is pressed by the spring $m$ against the hemp or flax which is placed between $h$ and $l$.

U is a board which is connected by springs $n$ $n$ to a horizontal bar, $o$, in the frame. Q and V V' represent dogs attached to one of the uprights $f$ at each end of said frame, as shown in Fig. 2.

The operation is as follows: The hemp or flax to be operated upon is placed in the clamp T, and power being applied to the shaft B, the clutch O is adjusted so as to engage with the pulley N, and the rack-bars R R and clamp T descend, the hemp or flax in the clamp passing between the fluted rollers I I', which bruise and break it. The hemp or flax, after passing between the rollers I I', passes between the rotary dressers G G', which separate the woody portion from the fiber, the latter remaining in the clamp. When the clamp reaches its lowest point of descent, which is near the rollers I I', the operator actuates the lever P so as to engage the clutch O with the pulley N', and the rack-bars R and clamp T are then moved upward, and when the clamp reaches the dogs V it strikes against their inclined under edge, is pressed against the bar o and then rolled over or upset, bringing the side which was formerly below to the top, and then passing down, guided by the dogs V', the swinging board U yielding to the pressure and allowing the clamp to adjust itself on the catches g of the rack-bars R as the latter descend by throwing the clutch O in connection with the pulley N. In this latter descent of the clamp T the butts of the hemp or flax which were above the clamp in its first descent are now made to pass down between the rollers I I' and rotary dressers G G', and when the clamp reaches its lowest point, it is again raised by reversing the movement as before, and when the clamp reaches the dogs V', the latter throw it out upon the platform of the framing. The clamp is then refilled and the operation repeated.

Having thus described my invention, what I claim as new, and desire to secure by Letters Patent, is—

1. The fluted breaking-rollers I I', in combination with the rotating dressers G G', provided with teeth c, and the clamp T, arranged to operate as and for the purpose set forth.

2. The dogs V V' and yielding board U, in connection with the rack-bars R R, all arranged to operate with the clamp T, as and for the purpose specified

C. G. HOWARD.

Witnesses:
JOHN H. BANKS,
F. W. GILES.